(12) United States Patent
Shinchi et al.

(10) Patent No.: US 6,313,407 B1
(45) Date of Patent: Nov. 6, 2001

(54) ULTRASONIC WELDING STRUCTURE

(75) Inventors: Akira Shinchi; Norihiro Ohashi, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/408,176

(22) Filed: Sep. 29, 1999

(30) Foreign Application Priority Data

Sep. 30, 1998 (JP) .................................................. 10-278444

(51) Int. Cl.[7] .................................................... H01R 4/00
(52) U.S. Cl. ............................................ 174/84 R; 174/92
(58) Field of Search ............................... 174/84 R, 94 R, 174/92; 156/580.2; 428/60; 439/460

(56) References Cited

U.S. PATENT DOCUMENTS

| 3,666,602 | * | 5/1972 | Obeda ................................ | 156/580.2 |
| 3,973,064 | | 8/1976 | Paine ..................................... | 428/60 |
| 5,869,784 | | 2/1999 | Shinchi ............................... | 174/84 R |
| 5,997,340 | * | 12/1999 | Ito et al. ............................... | 439/460 |

FOREIGN PATENT DOCUMENTS

| 0838883 | 4/1998 | (EP) . |
| 2143603 | 2/1985 | (GB) . |
| 09-320651 | 12/1997 | (JP) . |

OTHER PUBLICATIONS

UK Search Report, Jan. 1, 2000.

* cited by examiner

*Primary Examiner*—Chau N. Nguyen
(74) *Attorney, Agent, or Firm*—Finnegan, Henderson, Farabow, Garrett & Dunner, L.L.P.

(57) ABSTRACT

An ultrasonic welding structure is provided for a chip body 11 and a lid body 12 to be welded to each other by using ultrasonic waves. The chip body 11 is provided with a welding recess 15 defined by tapered sidewalls 15A, 15A. While, the lid body 12 is provided with a welding projection 17 also defined by tapered sidewalls 17C, 17C, for engagement with the welding recess 15. The chip body 11 and the lid body 12 in their assembled condition are subjected to ultrasonic oscillation characterized by its amplitude direction A. Then, since the welding surfaces of the sidewalls 15A, 17C each has a projected area with respect to the amplitude direction A, the welding surfaces are welded to each other owing to frictional heat resulting from the ultrasonic oscillation. With this welding structure, the chip body 11 is perfectly welded to the lid body 12 by one time of ultrasonic oscillation.

5 Claims, 8 Drawing Sheets

ULTRASONIC WELDING STRUCTURE

BACKGROUND OF THE INVENTION

1. Field of the Invention

The present invention relates to an ultrasonic welding structure obtained by oscillating a plurality of welding members with ultrasonic waves.

2. Description of the Related Art

As an earlier ultrasonic welding structure attained by oscillating objects with ultrasonic waves, there is known an ultrasonic welding structure of covered wires in Japanese Unexamined Patent Publication No. 9-320651 (U.S. Pat. No. 5,869,784).

In order to complete the above welding structure, a pair of covered wires are firstly arranged so as to intersect each other and thereafter, their resultant overlapping parts are interposed between an upper resin chip and a lower resin chip. While pressurizing the upper and lower chips from both sides thereof, the assembled chips interposing the covered wires therebetween are subjected to the ultrasonic oscillation in order to melt insulating covers of the wires at the intersection. After the covered wires have been electrically connected with each other at the intersection, the upper and lower resin chips are molten into one body to seal up the connection of the wires, thereby completing the connecting structure. Note, in order to interpose the covered wires stably, the lower resin chip is provided with recesses each having a waterproof groove, while the upper resin chip is provided with projections each having another waterproof groove, for respective engagement with the recesses. When assembling the upper resin chip to the lower resin chip for the ultrasonic oscillation, then both of waterproof grooves are integrated into one groove in which the molten cover of the wires is to be received, providing a waterproof sealing part of the connecting structure.

In the above-mentioned prior art, an ultrasonic horn is generally used for the ultrasonic waves for melting the covers of the wires and integrating the upper and lower resin chips. Meanwhile, in view of ensuring a welding fever, the ultrasonic oscillation is generally established in a manner that the oscillating direction of ultrasonic waves from the horn is perpendicularly to the objects' surfaces to be welded. Therefore, in the above connecting structure, a bottom face of each recess of the lower resin chip can be welded to a top surface of each projection of the upper resin tip owing to the adoption of the above relationship.

In the above-mentioned chips, however, opposing sidewalls defining each recess of the lower resin chip cannot be perfectly welded to opposing sidewalls defining each projection of the upper resin chip respectively since these sidewalls are all parallel with the oscillating direction of ultrasonic waves, which parallel relationship cannot provide a sufficient frictional welding fever between the upper and lower resin chips. Therefore, the resultant connecting structure is provided with perfect welded portions and imperfect welded portions in mix, which is far from the waterproof connecting structure. In other words, it means that, when ultrasonic-welding such objects having stepped portions as above, it is necessary to carry out the ultrasonic oscillating for several times in order to complete the waterproof structure.

SUMMARY OF THE INVENTION

It is therefore an object of the present invention to provide an ultrasonic welding structure which requires only one time ultrasonic oscillating in order to provide perfect welded portions in such objects having stepped portions.

The above-mentioned objects can be solved by providing an ultrasonic welding structure, comprising a pair of welding members to be welded to each other by oscillating the welding members by ultrasonic waves, the welding members being made of materials both soluble by this ultrasonic oscillation and having respective stepped welding surfaces to be welded to each other by the ultrasonic oscillation, wherein the welding members are adapted so that the stepped welding surfaces each inclines toward an amplitude direction of the ultrasonic waves at an angle.

Owing to the inclination of the stepped welding surfaces, they can form areas of projection with respect to the amplitude direction, so that the welding heat is generated on the welding surfaces. Consequently, the welding members can be certainly welded to each other by the ultrasonic oscillation in one execution.

The stepped welding surfaces each may have an unevenness toward the amplitude direction of the ultrasonic waves, and the unevenness are defined by sidewalls each inclining toward the amplitude direction of the ultrasonic waves.

In this case, since the uneven sidewalls are inclined to the amplitude direction of the ultrasonic waves, it is possible to weld the sidewalls to each other. Additionally, owing to the provision of unevenness on the welding members, it is possible to improve the assembling capability of the members before the ultrasonic oscillation.

In the above-mentioned ultrasonic welding structure, the sidewalls may be constituted by curved surfaces.

In this case, since the uneven sidewalls are curved, respective surfaces forming the sidewalls are inclined to the amplitude direction of the ultrasonic waves. Further, since the curved faces are welded to each other, it is possible to increase the welding area thereby improving the welding strength of the resultant structure.

In the above-mentioned ultrasonic welding structure, the welding members ma be made of synthetic resin.

In this case, it is possible to weld the welding members in a condition that a melting temperature by the ultrasonic oscillation is relatively low, improving the welding efficiency.

The above-mentioned ultrasonic welding structure further may have a plurality of covered wires each covered with synthetic resin, wherein the covered wires are overlapped with each other at a designated intersection and pinched between the welding members, and each of the covered wires is led out of the designated intersection is interposed between a recess formed on one of the welding members and a projection formed on the other welding member, for engagement with the recess.

In this case, by once executing the ultrasonic oscillation from one direction, it is possible to mutually weld the members' portions pinching the designated intersection and the members' portions pinching the covered wires led out of the designated intersection simultaneously. At the intersection, insulating covers of the wires are molten to electrically connect both conductors with each other. In this way, it is possible to form the welding structure where the covered wires are connected and retained complexly, with ease.

In the above-mentioned ultrasonic welding structure, the recess and the projection may be respectively provided with wire-accommodation recesses each of which encompasses the covered wire when the welding members are welded to each other.

In this case, it is possible to weld the welding members to each other while the covered wire is encompassed by the recess and the projection.

In the above-mentioned ultrasonic welding structure, the wire-accommodation recesses each may have a waterproof groove formed so as to surround the covered wire, for receiving molten synthetic resin of the covered wire.

In this case, since the waterproof groove is filled up with the molten synthetic resin of the covered wire, the wire-accommodation recesses allow the covered wire to be retained in a water-tight manner, whereby it is possible to prevent water from sinking between the welding members certainly.

These and other objects and features of the present invention will become more fully apparent from the following description and appended claims taken in conjunction with the accompany drawing.

DESCRIPTION OF THE PREFERRED EMBODIMENT

The ultrasonic welding structure of the embodiments will be described in detail, with reference to the attached drawings.

1st. Embodiment

Figure 1:
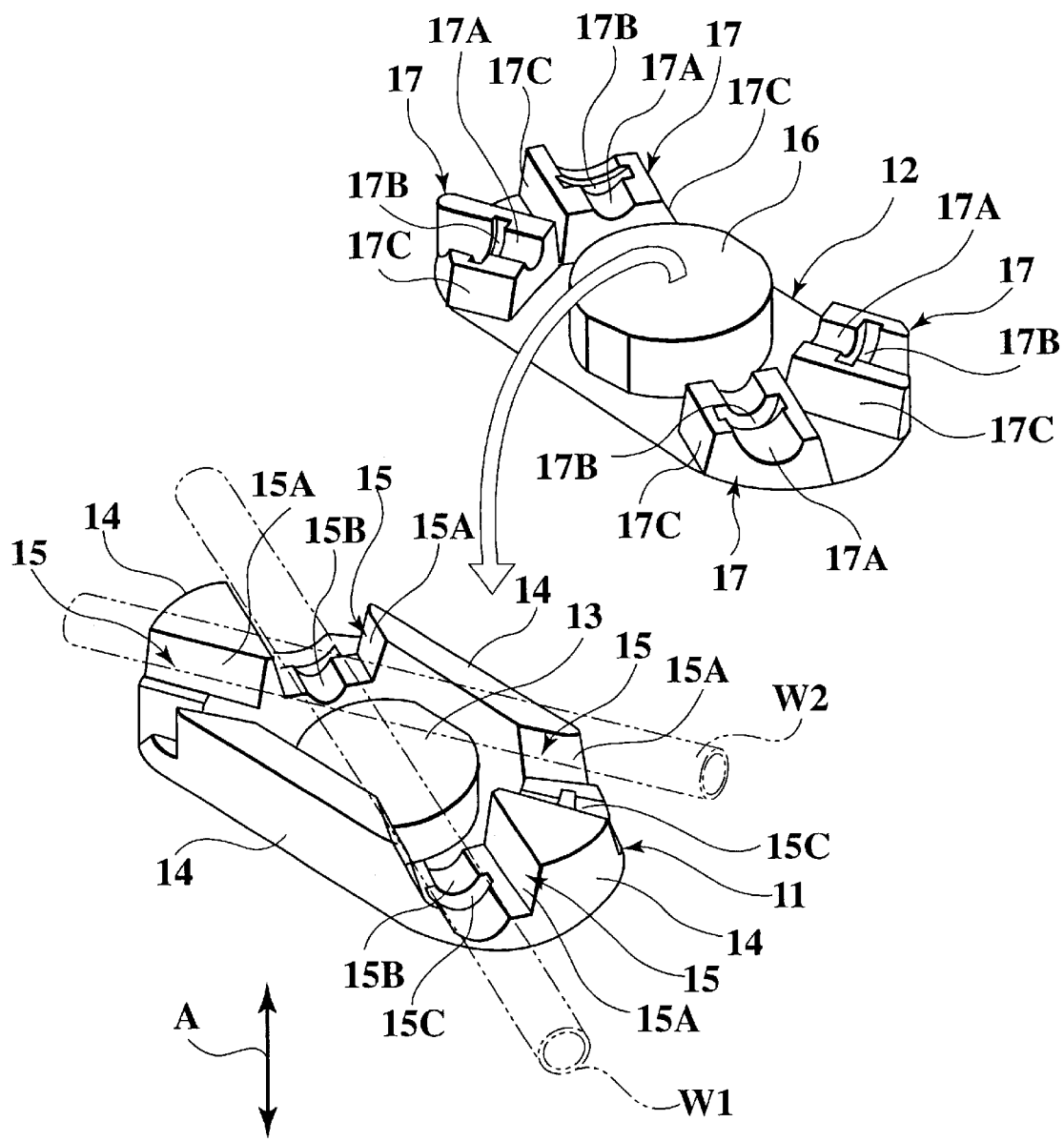
FIG. 1 is an exploded perspective view of an ultrasonic welding structure in accordance with the first embodiment of the present invention.
Figure 2:
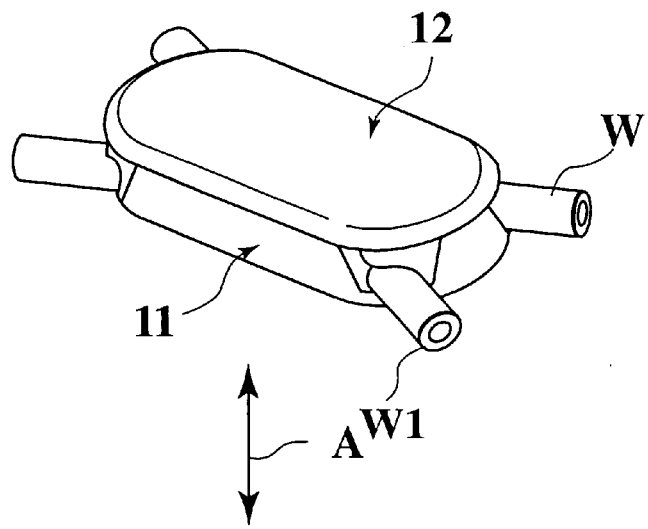
FIG. 2 is a perspective view of the ultrasonic welding structure of FIG. 1, showing its welded condition.
Figure 3:
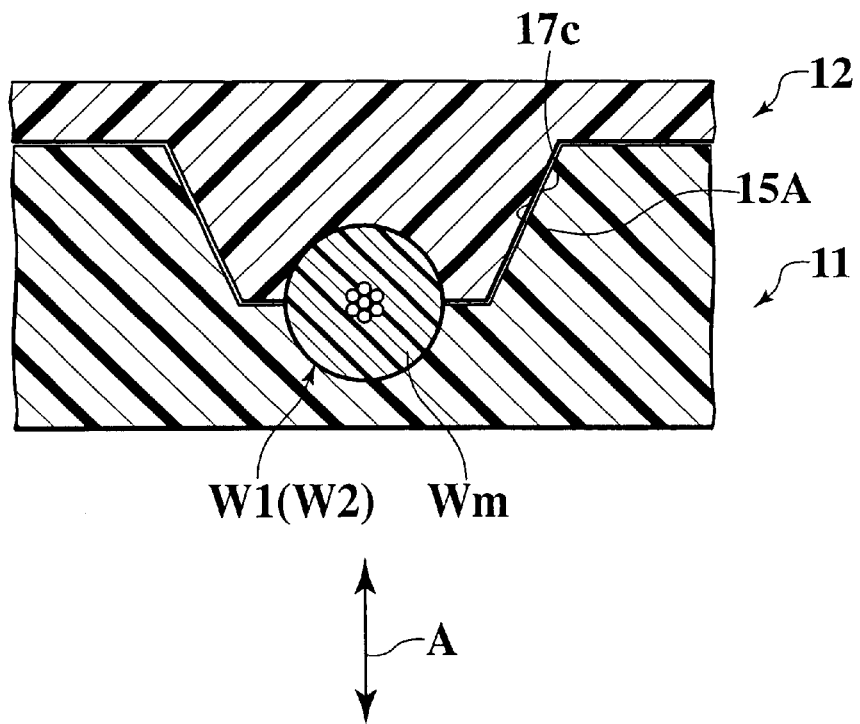
FIG. 3 is a sectional view of an essential part of the completed ultrasonic welding structure of FIG. 1.

FIG. 1 is an exploded perspective view of an ultrasonic welding structure in accordance with the first embodiment of the present invention, FIG. 2 a perspective view of the ultrasonic welding structure of FIG. 1, and FIG. 3 is a sectional view of an essential part of the completed ultrasonic welding structure of FIG. 1.

As shown in FIG. 1, a pair of covered wire W1, W2 are interposed between a chip body 11 and a lid body 12 as welding members of the ultrasonic welding structure.

The chip body 11 is made of synthetic resin. The chip body 11 has a column-shaped main welding part 13 formed at a center on the welding side of the body 11 and a raised peripheral part 14 formed on the periphery of the main welding part 13. The raised peripheral part sidewall 14 is provided, on four corners thereof, with welding recesses 15 for accommodating the covered wires W1 and W2. Note, both sidewalls 15A defining each of the recesses 15 are adapted so as to gradually approach each other as they approach the bottom of the recess 15. Each welding recess 15 is provided, on the bottom, with a wire-accommodation recess 15B which has a groove 15C formed for receiving the molten resin of the wires W1, W2 therein.

On the other hand, the lid body 12 is made of synthetic resin identical to the chip body's material and has a configuration identical to the chip body's same in plan view. Further, the lid body 12 has a column-shaped main welding part 16 formed to project at a center of the welding surface of the body 12. Outside the part 16, welding projections 17 are formed on the body 12, for engagement with the recesses 15 of the chip body 11. Each projection 17 is provided, on its surface abutting on the bottom of the recess 15, with a wire-accommodation recess 17A for receiving the wire W1 (or W2) together with each wire-accommodation recess 15B of the chip body 11. Also, the wire-accommodation recess 17A has a groove 17B formed for receiving the molten resin of the wires W1, W2 therein together with each groove 15C. Similarly, both sidewalls 17C defining each projection 17 are slanted so as to fit the sidewalls 15A of each recess 15 of the chip body 11.

In order to weld the so-constructed chip body 11 to the so-constructed lid body 12 while interposing the covered wires W1, W2 therebetween, it is firstly executed to dispose the covered wires W1, W2 in the recesses 15 on diagonal lines so as to intersect on the main welding part 13 of the chip body 11, as shown in FIG. 1. After that, as shown with a thick arrow of FIG. 1, the lid body 11 is overlaid on the chip body 11 for engaging the main welding part 13 and the recesses 15 of the chip body 11 with the main welding part 16 and the projections 17 of the lid body 12 respectively.

Under such a situation, it is carried out to oscillate the resultant assembly with the ultrasonic waves having the amplitude direction A of FIG. 2. Consequently, the surface of the main welding part 13 and the top face(s) of the raised peripheral part 14 of the chip body 11 are welded to the surface of the main welding parts 16 and the bottom face of the lid body 12, respectively and certainly since all the surfaces and faces are perpendicular to the amplitude direction of ultrasonic waves. Also, according to the invention, since the sidewalls 15A of the recesses 15 and the sidewalls 17C of the projections 17 are inclined to the amplitude direction of ultrasonic waves at an angle, both sidewalls 15A, 17C can be welded to each other by frictional heat resulting from the ultrasonic oscillation.

At the same time, since the covered wires W1, W2 are in contact with the wire-accommodation recess 15B, 17A through their curved circumferential faces about the wires W1, W2 and therefore, these faces do cross the amplitude direction of ultrasonic waves at angles, the wires W1, W2 can be welded to these curved faces by the ultrasonic oscillation. Then, as the grooves 15C, 17B are filled up with the covering resin molten, it is possible to prevent outside water from sinking into the resultant assembly.

Prior to this ultrasonic oscillation, note, since the grooves 15C, 17B have been partially filled by the covering resin forced at the time of interposing the covered wires W1, W2 between the chip body 11 and the lid body 12, the filling-up of the covering resin can be progressed by this ultrasonic oscillation and furthermore, it is possible to progress the welding of the charged covering resin to the inner faces of the grooves 15C, 17B.

FIG. 3 is a sectional view showing a welding part between the covered wire W1 (W2) and the wire-accommodation recess 15B, 17A. As shown in the figure, since the sidewalls 15A, 17C of the embodiment are inclined to the amplitude direction A of ultrasonic waves at an angle of about 30 degrees, the contact faces of the sidewalls 15A, 17C have an area of projection with respect to the amplitude direction A of ultrasonic waves. Therefore, at the contact faces of the sidewalls 15A, 17C, there are caused oscillations in directions along which the sidewalls 15A, 17C collide with each other, so that the welding between the sidewalls 15A and 17C can be completed by the frictional heat. Additionally, since the formation of the inclined sidewalls 15A, 17C allows the projections 17 to be introduced into the recesses 15 with ease, it is possible to improve the assembling capability of the chip body 11 to the lid body 12. Further, as shown in the figure, since a covering resin Wm of the covered wire W1 (W2) is accommodated in a circular-sectional space defined by the wire-accommodation recess 15B, 17A, the chip body 11 and the lid body 12 do effect superior tightness between the wire-accommodation recess 15B, 17A and the wire W1 (W2), whereby the oscillation heating can be certainly caused therebetween, thereby completing the welding.

2nd. Embodiment

Figure 4:
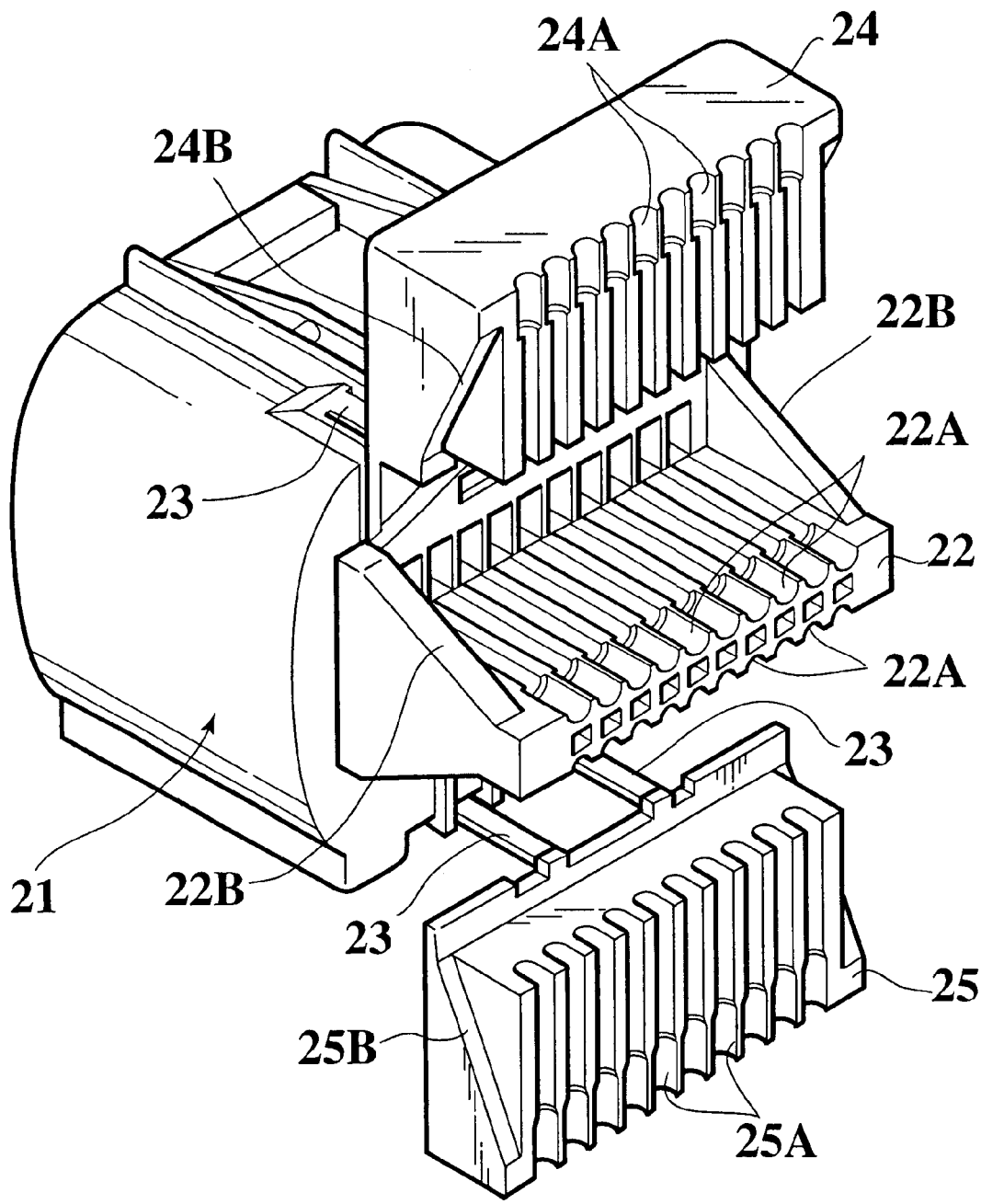
FIG. 4 is a perspective view of an ultrasonic welding structure in accordance with the second embodiment of the present invention.
Figure 5:
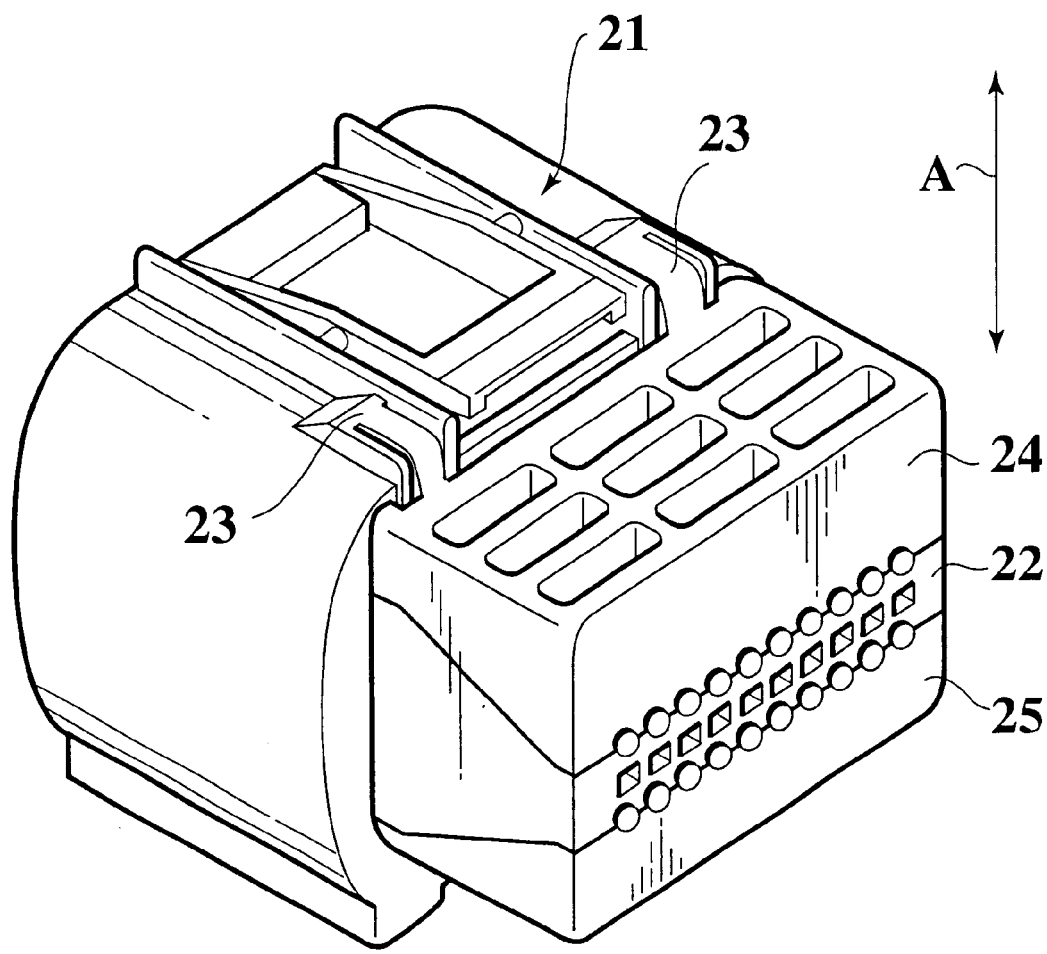
FIG. 5 is a perspective view of the ultrasonic welding structure of FIG. 4, showing its welded condition.

FIGS. 4–6 show the ultrasonic welding structure in accordance with the second embodiment of the invention.

In the figures, reference numeral 21 designates a wire retaining member, such as a connector, which is capable of retaining connected electrical wires therein. The wire retaining member 21 is provided with a wire mounting part 22 having a plurality of wire grooves 22A formed on upper and lower faces of the part 22, for receiving a plurality of wires in parallel. Above and below a base of the part 22, an upper lid member 24 and a lower lid member 25 are respectively connected to the base through hinge members 23 so as to pivot thereabout for covering upper and lower faces of the part 22, respectively. Both upper and lower lid members 24, 25 are provided, on their surfaces being abutted against the wire mounting part 22, with wire press grooves 24A, 25A, respectively. On both sides of the upper and lower portions of the part 22, welding faces 22B for contact with the upper and lower lid members 24, 25 are formed so as to incline toward a horizontal plane defined by the juxtaposed grooves 22A. While, corresponding to the welding faces 22B of the wire mounting part 22, the upper and lower lid members 24, 25 are provided with welding faces 24B, 25B for abutment with the tapered welding faces 22B, respectively. FIG. 5 shows a condition where the upper and lower lid members 24, 25 are welded to the wire mounting part 22 while eliminating covered wires W.

As shown in FIG. 5, in case of oscillating the wire retaining member 21 with the ultrasonic waves along the amplitude direction A, each of the welding faces 22B, 24B, 25B forms an area of projection with respect to the amplitude direction A since these faces are inclined to the amplitude direction A. In this way, the welding faces 22B, 24B, 25B are certainly welded to each other by the ultrasonic oscillation.

Figure 6A:
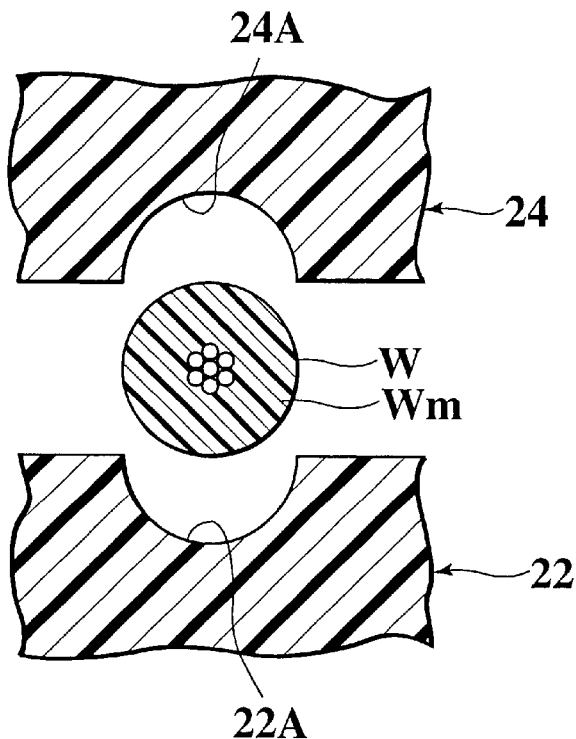
FIGS. 6A and 6B are sectional views of an essential part of the ultrasonic welding structure of the second embodiment.
Figure 6B:
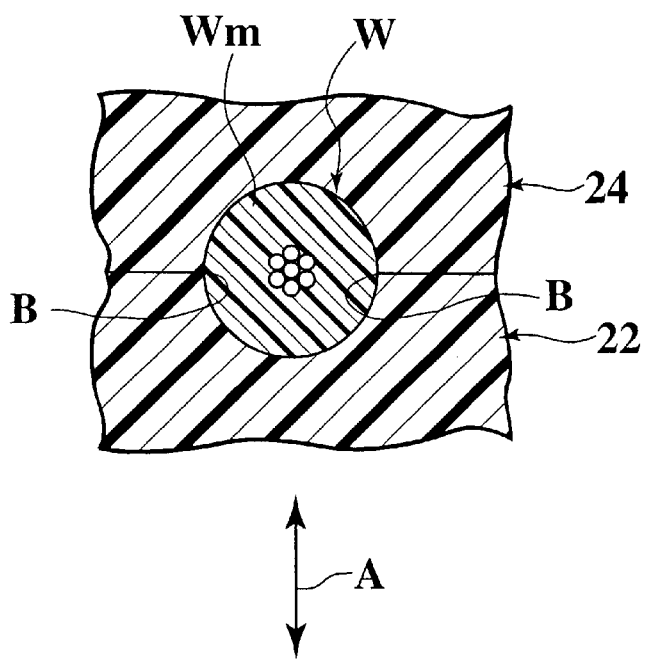

FIGS. 6A and 6B show a process of accommodating the covered wire W between the wire grooves 22A of the wire mounting part 22 and the wire press grooves 24A of the upper lid member 24; FIG. 6A show a condition before accommodating the wire W, while FIG. 6B show a condition after accommodating the wire W. As shown in the figures, a wire-accommodation space defined by both of the grooves 22A, 24A has a circular section. This formation of the circular-sectional space allows the inner walls of the grooves 22A, 24A to certainly contact with the periphery of the wire W under pressure, whereby the waterproof sealing for the wire can be effected.

3rd. Embodiment

Figure 7:
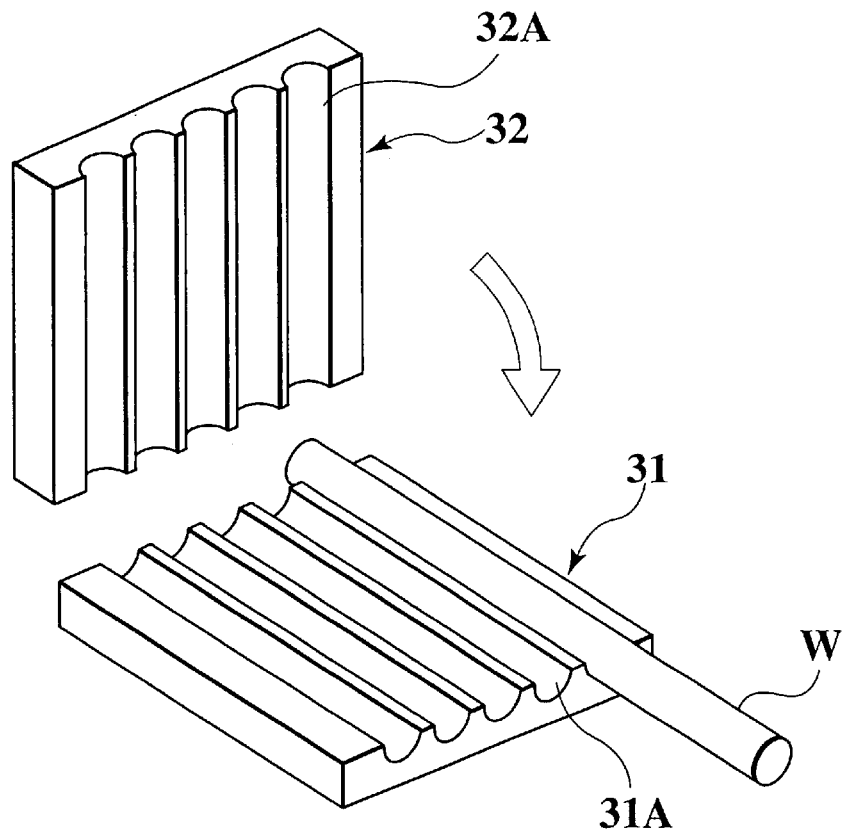
FIG. 7 is a perspective view of an ultrasonic welding structure in accordance with the third embodiment of the present invention.
Figure 8:
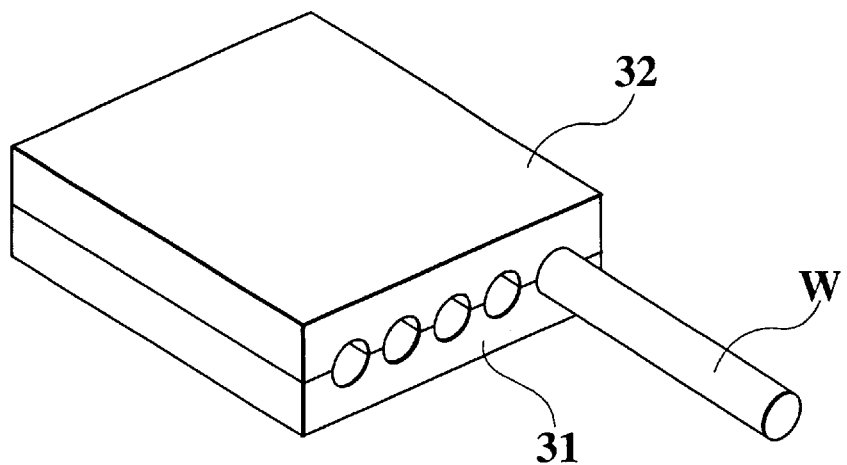
FIG. 8 is a perspective view of the ultrasonic welding structure of FIG. 7, showing its welded condition.

FIGS. 7 and 8 show the ultrasonic welding structure in accordance with the third embodiment of the invention. According to the embodiment, a pair of wire pinching members 31, 32 are welded to each other while interposing the covered wires W (only one shown in the figures) therebetween. The wire pinching members 31, 32 are provided, on respective opposing faces thereof, with a plurality of parallel wire accommodation grooves 31A, 32A each having a semi-circular section, respectively. In assembling, upon accommodating the covered wires W in the wire accommodation grooves 31A of the wire pinching members 31, the wire pinching member 32 is assembled to the wire pinching members 31 and thereafter, the resultant assembly is subjected to the ultrasonic oscillation, thereby completing the ultrasonic welding structure as shown in FIG. 8. In this welding structure, since each of the wire accommodation grooves 31A, 32A has the semi-circular section, a wire-accommodation space resulting from the ultrasonic welding has a circular section. This formation of the circular-sectional space allows the inner walls of the grooves 31A, 32A to certainly contact with the periphery of the wire W under pressure, whereby the waterproof sealing for the wire can be effected.

It will be understood by those skilled in the art that the foregoing descriptions are the above-mentioned embodiments of the disclosed ultrasonic welding structure, and that various changes and modifications may be made to the present invention without departing from the spirit and scope thereof.

Figure 9A:
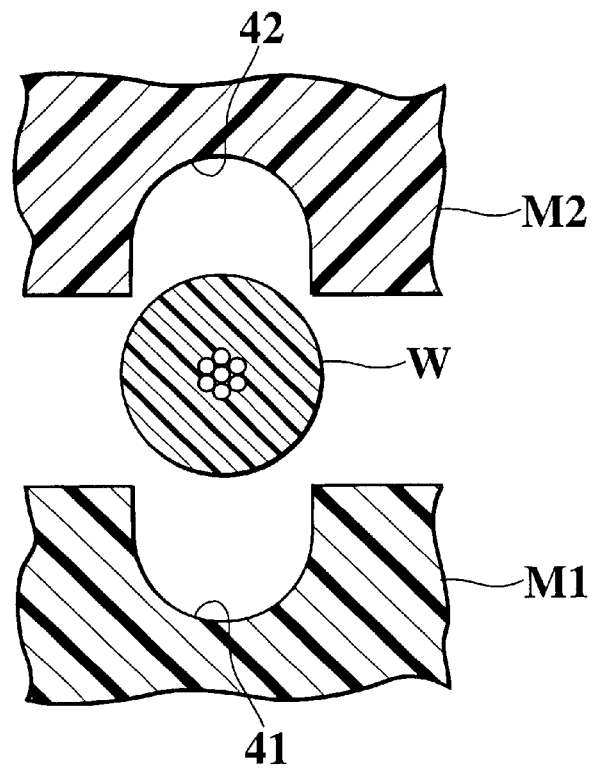
FIGS. 9A and 9B are sectional views of an essential part of the ultrasonic welding structure of the invention, showing a modification of the invention.
Figure 9B:
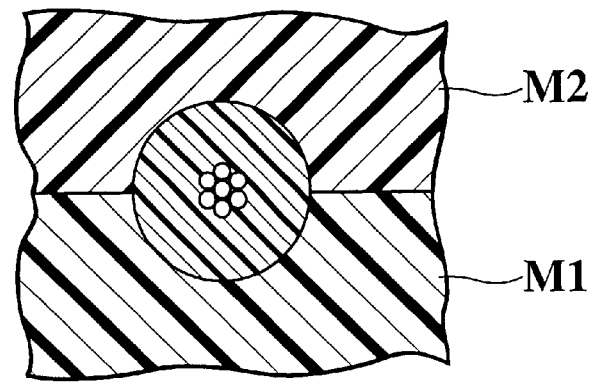

For example, as shown in FIG. 9A, a wire pinching member M1 may be provided with a plurality of grooves 41 each having a semi-oblong section, while another wire pinching member M2 is also provided with a plurality of grooves 42 each having a semi-oblong section. In this case, owing to the ultrasonic welding, a cross section of the assembled grooves 41, 42 may be changed to a wire accommodation space having a circular section, as shown in FIG. 9B.

Figure 10A:
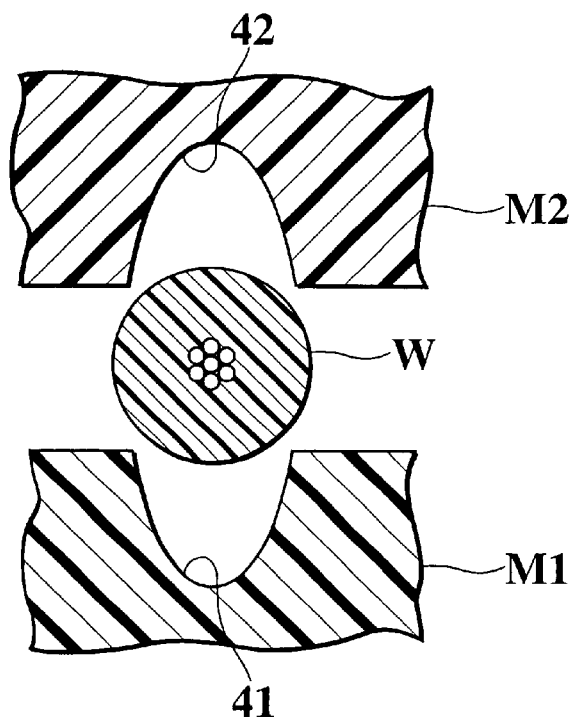
FIGS. 10A and 10B are sectional views of an essential part of the ultrasonic welding structure of the invention, showing another modification of the invention.
Figure 10B:
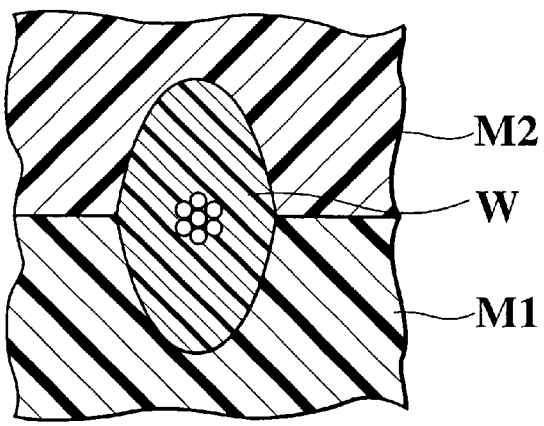

Alternatively, as shown in FIG. 10A, the wire pinching members M1, M2 may be provided with grooves 41, 42 each having an semi-oval section, respectively. In this case, owing to the ultrasonic welding, the assembled grooves 41, 42 provide a wire accommodation space having an oval section, as shown in FIG. 10B.

In common with the above-mentioned modifications, since each groove 41, 42 is shaped so as to have neither angular part nor corner part, it is possible to form the welded wire accommodation space for accommodating the covered wire W under pressure, whereby the waterproof welding structure can be completed.

Additionally, although the ultrasonic welding structure of the invention is directed for accommodating the covered wires in the above-mentioned embodiments, wires with no insulating cover may be used in the structure. Alternatively, the present invention may be also applied to a welding structure using no wire.

What is claimed is:

1. An ultrasonic welding structure, comprising:

a pair of welding members to be welded to each other by oscillating the welding members by ultrasonic waves, the welding members being made of materials soluble by this ultrasonic oscillation;

wherein one of the welding members defines at least one recess, the recess having two sidewalls and a bottom, wherein the recess sidewalls are slanted to gradually approach each other as they approach the recess bottom, and wherein the recess sidewalls incline to an amplitude direction of the ultrasonic waves at an angle;

wherein the other of the welding members defines at least one projection, the projection having two sidewalls, wherein the projection sidewalls are slanted so as to fit the recess sidewalls when the recess engages with the projection, and wherein the projection sidewalls incline to the amplitude direction of the ultrasonic waves at an angle; and wherein the recess sidewalls and the projection sidewalls may be welded to each other by the ultrasonic oscillation.

2. The ultrasonic welding structure as claimed in claim 1, wherein the welding members are made of synthetic resin.

3. The ultrasonic welding structure as claimed in claim 1, further comprising a plurality of covered wires each covered with synthetic resin, wherein the covered wires are overlapped with each other at a designated intersection and pinched between the welding members, and each of the covered wires being led out of the designated intersection and being interposed between the recess and the projection.

4. The ultrasonic welding structure as claimed in claim 3, wherein the recess and the projection are respectively provided with wire-accommodation recesses each of which encompasses the covered wire when the welding members are welded to each other.

5. The ultrasonic welding structure as claimed in claim 4, wherein the wire-accommodation recesses each has a waterproof groove formed so as to surround the covered wire, for receiving molten synthetic resin of the covered wire.

\* \* \* \* \*